March 31, 1970  KIYOSHI INOUE  3,503,860
LOW-TEMPERATURE DIFFUSION PROCESS
Filed May 7, 1968
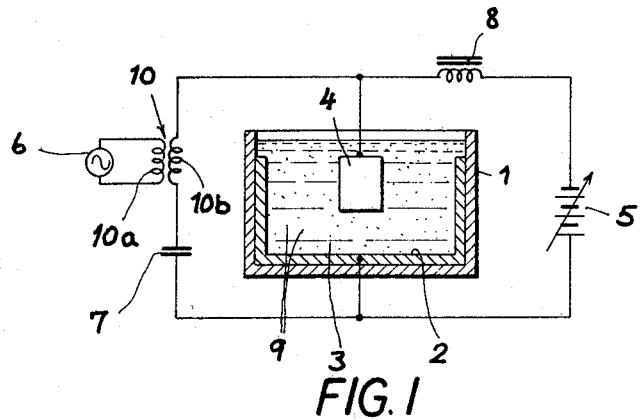
FIG. I
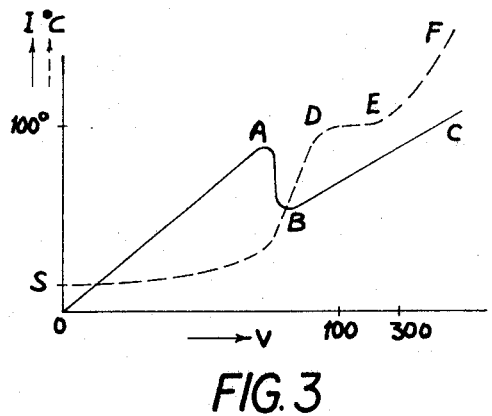
FIG. 3
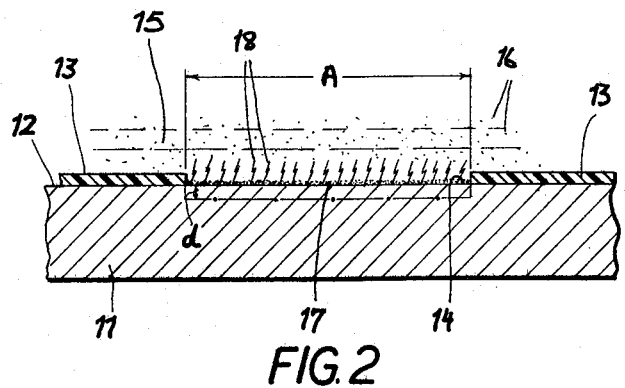
FIG. 2
Kiyoshi Inoue
INVENTOR.
BY
Karl G. Ross
Attorney United States Patent Office 3,503,860
Patented Mar. 31, 1970

3,503,860
LOW-TEMPERATURE DIFFUSION PROCESS
Kiyoshi Inoue, Tokyo, Japan
(100 Sakato, Kawasaki, Kanagawa, Japan)
Continuation-in-part of applications Ser. No. 399,243, Sept. 25, 1964, and Ser. No. 405,051, Oct. 20, 1964. This application May 7, 1968, Ser. No. 727,196
Claims priority, application Japan, May 15, 1967, 42/30,726; May 17, 1967, Ser. No. 42/31,366
Int. Cl. C23b 13/00, 5/52, 5/50
U.S. Cl. 204—181                    10 Claims

ABSTRACT OF THE DISCLOSURE

A process for the low-temperature ionic diffusion of a substance deposited upon a metallic substrate in an electrolyte in which the substrate is spacedly juxtaposed with a counterelectrode and the applied electric current and voltage is established at a level to maintain a surface temperature between 100° C. and 300° C. Scaling is prevented by generating spark discharge along the surface of the substrate which may be masked at selected portions with polyethylene film to localize the diffusion and pattern the surface. The electric discharge occurs in the form of a sheet with an intensity less than that at which pitting occurs.

The current applied is disclosed as being predominantly undirectional with a superimposed high-frequency component having a frequency of 100 kHz. to the order of several mHz. The electrolyte disclosed may be either ionic or non-ionic. The substance is suspended in the electrolyte and migrates to the substrate where the described current causes the substance to ionically diffuse into the substrate. The substance includes powders of B, Ta, $Al_2O_3$, Cu, Au, Ti, C, Va, Nb, P, As, Cr, Mo; carbides of W, Ti, Nb and Ta, and $MoS_2$.

---

This application is a continuation-in-part of applications Ser. Nos. 399,243, now Patent 3,446,718, and 405,051, filed Sept. 25, 1964, and Oct. 20, 1964, respectively.

In application Ser. No. 399,243, I have described a process for the chemical synthesis of organic compounds which extends principles set forth in the earlier application Ser. No. 356,715, filed Apr. 2, 1964, now U.S. Patent No. 3,250,892, whereby electrical energy is employed to produce molecular entities or ionic species permitting the drift of such particles to a substrate immersed in an electrolyte by electrically induced electrolytic diffusion or electrophoretic action. As pointed out in application Ser. No. 399,243 and the later application Ser. No. 405,051, it is possible to use such techniques to deposit various substances on conductive bodies. Thus, these systems provide for the ionization or electrical charging of a migratory species in an electrolyte, the species being present in solution or suspension, which are induced by a unidirectional (predominantly D.C.) electric field to migrate through the electrolyte to the substrate and deposit thereon. In still earlier applications, copending with the chain of applications mentioned above and since issued as U.S. Patents No. 3,098,151, No. 3,198,675 and No. 3,232,747, it is pointed out that an electric current applied between a counter electrode and a substrate immersed in an electrolyte can result in electrolytic heating of the body. In application Ser. No. 405,051, this principle is applied to thermal diffusion into the crystal lattice, under the influence of an electric field, of substances deposited thereon from the electrolyte.

That system involves the generation of sufficien heat at the electrolyte/substrate interface to permit at least partial diffusion or interdiffusion at the interface by means of electric energy. The penetration of the diffusible particles is facilitated by the use of high-frequency fields which appear to activate the crystal lattice or destroy a barrier to diffusion. An important feature of that system involved the combined deposition at the surface of the substrate of ionic species or fragments containing the element or elements to be diffused into and within the crystal lattice, and the fragmentation or decomposition of these species at the surface upon such deposition to make available an element capable of penetrating the lattice. Thus, anions of a soluble salt, preferably anions consisting of the element to be diffused into the substrate in combination with oxygen, could be considered to migrate under the action of an essentially unidirectional electric field to deposit on the substrate; the deposited anion can be fragmented by electrical discharge energy or electrically produced thermal energy. Continuance of the current flow subsequent to the composition and decomposition of anions results in a penetration of elemental fragments into the lattice structure. The electrolyte contains an organic or inorganic salt whose anions and cations respectively migrate to the anode and cathode across which the direct current is applied. Upon decomposition of the cation and anion, the diffusible element respectively produced by such decomposition penetrates the respective crystal lattice. Thus, a steel body can be "case-hardened" in an electrolyte having an anion-containing carbon (e.g. an acetate, carbonate or bicarbonate anion). When it is desired to increase the sulfur content in a surface zone of a steel or molybdenum body, to reduce the sliding friction of the surface or achieve some other purpose, the electrolyte can contain sulfite, sulfide or sulfate anions, although the high thermal stability of the latter renders their use uneconomical in many instances in which the system of application Ser. No. 405,051 can be otherwise applied. Nitrification of the metallic body was effected using electrolyte solutions containing nitrate, nitrite or other nitrogen-containing anions in combination with cations such as ammonium ions.

The last-mentioned application also notes that diffusion can be carried out with compounds or species which are not fully decomposed at the time of penetration into the lattice of the substrate. For example, it has been found to be possible to bond finely divided tungsten carbide to a steel substrate and to diffuse it into the latter by suspending the tungsten-carbide powder in a liquid of suitable density (e.g. an oil) which acts as an electrolyte with respect to migration of the powder. Surprisingly, a high proportion of a conductive powder (e.g. 50% by weight) will render the vehicle sufficiently conductive to permit deposition of the powder under the influence of the electric field, if the powder is more or less charged or admits of molecular motion to carry the powder to the interface of the substrate and electrolyte at which high-current electrical energy develops sufficient heat to permit diffusion and bonding. The rate at which the powder will deposit and bond to the electrode surface is increased by vibrating the electrodes transversely of their confronting surfaces and in the direction of current flow at a sonic frequency (from about 50 Hz.) to the order of several kHz. It is also advantageous to oscillate the electrodes in the plane of the surfaces to be treated at somewhat higher frequencies also within the sonic range.

It is also noted in this application that surprising and unobvious results are obtained when a high-frequency alternating current is superimposed upon the direct or heating current. The alternating current should preferably be in the megacycle range and not less than about 100 kHz. and appears to increase sharply the rate of penetration of the substrate and the strength of the bond between the latter and the deposited substance. While it is believed that this increase in bonding strength and rate of diffusion is a consequence of a reduction in the barrier energy which the energy of the particle must exceed to penetrate the lattice of the substrate, it is by no means certain and applicant does not wish to be bound by any theory in this respect. It may be observed, however, that the penetration of a crystal lattice from without can be considered analogous to the work function of electron emission from a surface; in both cases, it appears that a characteristic energy is required before the event can be induced to occur. One method of inducing the result is to raise the energy of the particle by thermal or electrical means to a satisfactory level, while another is to lower the barrier energy as is possible with the use of the high-frequency alternating current as described in application Ser. No. 405,051.

It is the principal object of the present invention, to provide an improved system for depositing substances upon a conductive substrate and diffusing such substances into the crystal lattice thereof, thereby extending principles originally set forth in the aforementioned applications and Letters Patent.

I have now found, totally surprisingly, that it is possible to diffuse mobile fragments and species (e.g. elements or molecular particles) into the crystal lattice of a metallic substrate immersed in an electrolyte and juxtaposed with a counterelectrode across which the electric current is applied, at extraordinarily high rates and to considerable penetration depths by limiting rather than increasing the temperature generated at the electrolyte/substrate interface. More specifically, I have found that as the voltage across the system is increased, a unique phenomenon occurs, this phenomenon being characterized by a reversal of the change in current with voltage $dI/dV$ as the temperature at the interface continues to rise. However, as the rate of temperature change (with respect to voltage $dT/dV$ approaches zero at a temperature level of 100° C. to 300° C., a level which appears to be more or less independent of the nature of the substrate and the nature of the electrolyte, the penetration of the substrate is at an unusually high level. Hence, in spite of the fact that all earlier evidence appears to point to the need for temperatures above the 300° C. maximum at which the present system is carried out and appears to emphasize the need for increasing the surface temperature, it is possible to effect diffusion at temperatures so close to ambient temperatures as to greatly facilitate the process. Further more, temperature-sensitive metallic surfaces can now be treated without difficulty. For example, electrolytic heating methods frequently destroyed surface qualities at the high temperatures necessary to permit diffusion even in systems of the type described in my application Ser. No. 405,051.

According to a more specific feature of this invention, a sheetlike microscopic nonpitting electric discharge is sustained uniformly along the exposed surfaces of a conductive substrate while the electric current parameters are selected to maintain a temperature at the interface of 100° C. to 300° C., preferably around 100° C. The electrolyte, which may be an aqueous salt solution, preferably contains up to 25% by weight glycerin which has been found to promote uniform surface finishes. The diffused material may be metallic powder and preferably a high-frequency alternating current is superimposed upon the direct current in accordance with the principles of application Ser. No. 405,051. Furthermore, it has been found that ammonium chloride and other halide salts not normally used in electrolytic heating processes catalyze or otherwise promote the penetration of the migrating species into the crystal lattice of the substrate.

The above and other objects, features and advantages of the present invention will become more readily apparent from the following description, reference being made to the accompanying drawing in which:

FIG. 1 is a vertical cross-sectional view, in diagrammatic form, of an apparatus for diffusing a metallic powder into a metallic substrate, according to this invention;

FIG. 2 is a cross-sectional view, greatly enlarged, of a substrate adapted to receive the deposit; and FIG. 3 is a graph illustrating some of the features of the present invention.

In FIG. 1 of the drawing, I show a system for the deposition of a powdered material upon a metalliv substrate 4 which is suspended in an electrolyte 3 contained in a vessel 1 and is juxtaposed with a counterelectrode 2 lining the wall of the vessel. A powdered material 9 is suspended in the electrolyte which may be ultrasonically or mechanically agitated to maintain the powder in suspension. The electrolytic heating source comprises a battery 5, which is representative of any direct-current source, connected across the electrodes 2 and 4 in series with a choke 8. The choke 8 serves to dissipate surges which might otherwise be applied to the source 5. In addition, a high-frequency alternating current source 6 energizes the primary winding 10a of a coupling transformer 10 whose secondary winding 10b is connected in series with the direct-current blocking capacitor 7, across the electrodes 2 and 4.

In FIG. 2, I have diagrammatically illustrated the principles of the present invention. The substrate 11 of this figure has an upper surface 12 which is partially masked by a polyethylene film 13 to expose the surface 14, which is localized over the area A to the action of the system of FIG. 1. The electrolyte 15 in contact with the surface 14 contains suspended metal powder 16 which may absorb electric charge or otherwise ionically or electrophoretically migrates to the surface 14 to form a layer 17 along the interface.

At this interface, in accordance with the principles discussed in the aforementioned patents and applications, there may be a formation of microscopic or submicroscopic gas bubbles which provide some of high resistivity to generate heat along the surface and permit thermal diffusion into a zone D within the outlines of area A to a depth which is a function of the electrical parameters and the temperature. In accordance with the present invention, a uniform spark-type discharge represented at 18 is promoted in a sheetlike or blanket discharge over the entire area A at the interface to prevent scaling or remove the scale. The shield 13 is uneffected by the discharge which is at an energy level such that pitting of the surface does not occur. It will be understood that a distinctive level of voltage and current exists for any substantially metallic surface and for any electrolyte at which pitting (i.e. the formation of recesses or cavities in the surface) will develop and below which, no such pitting will occur. Throughout the range, from incipient discharge formation to this level, the principles of the present invention are applicable.

In FIG. 3, I show a graph of the voltage, plotted as the abscissa, against the temperature at the interface, plotted along the ordinate and represented as the broken line graph, and current which is also plotted along the ordinate but is represented as a solid line. The graph relates to Example I below and is typical of a system such as that shown in FIG. 1. As the voltage increases, the temperature at the interface initially rises slowly from the starting temperature S to a point B corresponding to a sharp dip in the measured current at the region A of the graph. In spite of a substantially instantaneous fall of current with increasing voltage, the temperature at the surface rises sharply to the point D at which it levels off prior to rising again from the zone E to F. I have found that in this region (i.e. from the region D to F) up to 300° C., diffusion is at its maximum. Best results, however, are obtained with a voltage of substantially 100 to 300 volts and temperature in the region of 100 to 150° C. and, still more significatntly, of around 100° C. Thus, the present invention should preferably be carried out at a voltage substantially midway between the limits (D and E) of the plateau of the temperature-voltage curve.

EXAMPLE I

Using the system illustrated in FIG. 1, a S15c still having a diameter of 6 mm. and the length of 15 mm. was spaced from a stainless steel counterelectrode by a distance of 10 cm. in an aqueous electrolyte containing 50% by weight glycerin and 5% by weight potassium acetate. The applied voltage was 150 volts and the surface temperature was 100° C. A diffusion coefficient of $3.2 \times 10^{-7}$ cm.$^2$/sec. was observed. In the same system, when 180 volts direct current, upon which 100 volts A.C. at 350 kHz. was superimposed, a surface temperature of 100° C. was obtained and the diffusion coefficient was $4.8 \times 10^{-7}$ cm.$^2$/sec.

Again, with the relationship of counterelectrode and workpiece described earlier and the same electrolyte, I used a series of 10 microsecond pulses at intervals of 10 microseconds and a peak-to-peak potential of 300 volts (during which the workpiece is positive) with interspersed negative pulses of 5 microsecond duration and 15 microsecond spacing at 50 volts peak-to-peak. The temperature at the workpiece surface is 100° C. The diffusion constant is found to be $6.1 \times 10^{-7}$ cm.$^2$/sec. All along the exposed surface of the electrode, a blanket-type nonpitting discharge prevents scale formation.

EXAMPLE II

The S15c steel electrode of Example I is provided with diffusion coating of boron by dispersing 10% by weight of boron powder (400 U.S. mesh) in an aqueous electrolyte containing 10% by weight potassium acetate. 3% by weight ammonium chloride was dissolved in the electrolyte. The unidirectional potential of 80 volts was applied for 30 minutes and a boron diffusion of 150 microns depth was obtained. Using the same unidirectional potential for only 5 minutes and upon superimposition of 450 kHz. alternating current at 30 volts (peak-to-peak), a penetration depth of 100 microns was obtained.

EXAMPLE III

Using the electrolyte and workpiece of Example II, aluminum powder (15% by weight in the electrolyte of 320 U.S. mesh) was diffused into the substrate with a unidirectional potential of 80 volts for a period of 30 minutes. The penetration depth was 60 microns. Using a diffusion time of 5 minutes and superimposing 500 kHz. high-frequency A.C. at 30 volts on the system, the penetration depth was 56 microns.

EXAMPLE IV

Using the electrode and electrolyte arrangement of Example II and a powder component consisting of 5% by weight of the electrolyte of 300 U.S. mesh tantalum powder and 1% by weight of the electrolyte of 300 U.S. mesh aluminum oxide ($Al_2O_3$), a penetration depth of 220 microns was obtained in 30 minutes with a D.C. potential of 80 volts. Superimposition of 500 kHz./sec. at 30 volts for a total processing time of 5 minutes resulted in a penetration depth of 180 microns.

When ammonium chloride was not used and the electrolyte conductivity restored with other acetate salts, a substantial drop in the penetration depth was observed.

The system of the specific examples has been found to be effective with copper, gold, silicon, titanium, carbon, vanadium, niobium, phosphorus, arsenic, chromium and molybdenum, with tungsten carbide, titanium carbide, niobium carbide, tantalum carbide and molybdenum disulphide, all in addition to the powders used in Examples II–IV. In all of the aforedescribed examples, the diffusion depth was 10–20 times greater than that which could be obtained by thermal methods at 100° C. over similar periods.

I claim:

1. A method of diffusing a substance into a metallic substrate, comprising the steps of immersing said substrate into an aqueous electrolyte containing a substance capable of migrating under a unidirectional field and spaced from a counterelectrode in contact with said vehicle; applying a predominantly unidirectional current through said electrode and said substrate of an intensity sufficient to promote a uniform nonpitting blanket discharge along a surface of the substrate in contact with said electrolyte to prevent the formation of scale thereon and poled to effect migration of said substance to said surface of said substrate in contact with said vehicle while of an intensity sufficient only to maintain the temperature at said surface in the range of 100° C. to 300° C. and effect diffusion of the substance into said substrate; and superimposing uopn said predominantly unidirectional current a high-frequency current component with a frequency ranging from 100 kHz. to the order of several mHz.

2. The method defined in claim 1 wherein said substance is a metallic powder suspended in said aqueous electrolyte.

3. The method defined in claim 2 wherein said component is high-frequency alternating current.

4. The method defined in claim 2 wherein said electrolyte contains a halide salt.

5. The method defined in claim 4 wherein said halide salt is ammonium chloride.

6. The method defined in claim 2 wherein the voltage applied between said electrode and said substrate is about 100 to 300 volts.

7. The method defined in claim 2 wherein said metal powder is composed of a substance selected from the group consisting of boron, tantalum, aluminum, aluminum oxide, copper, gold, silicon, titanium, carbon, vanadium, niobium, phosphorus, arsenic, chromium, molybdenum, tungsten carbide, titanium carbide, niobium carbide, tantalum carbide and molybdenum disulphide.

8. The method defined in claim 7 wherein said substrate is composed of steel.

9. The method defined in claim 2, further comprising the step of masking a portion of said substrate with a synthetic resin film to expose only a limited surface to said vehicle.

10. The method defined in claim 2 wherein the temperature at said surface is maintained at about 100° C. by said current.

References Cited

UNITED STATES PATENTS

| | | | |
|---|---|---|---|
| 2,522,082 | 9/1950 | Arnold | 204—14 XR |
| 2,824,830 | 2/1958 | Hausner | 204—45 |
| 3,024,177 | 3/1962 | Cook | 204—39 |

JOHN H. MACK, Primary Examiner

W. B. VANSISE, Assistant Examiner

U.S. Cl. X.R.

204—14, 35, 37, 38, 228